(12) United States Patent
Pittenger et al.

(10) Patent No.: US 8,943,129 B2
(45) Date of Patent: Jan. 27, 2015

(54) DOCUMENT BASED CONFERENCING

(75) Inventors: Jason T. Pittenger, Menlo Park, CA (US); Nigel Pegg, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1426 days.

(21) Appl. No.: 12/021,141

(22) Filed: Jan. 28, 2008

(65) Prior Publication Data

US 2014/0032677 A1    Jan. 30, 2014

(51) Int. Cl.
G06F 15/16       (2006.01)

(52) U.S. Cl.
USPC ........................ 709/204; 709/217; 709/219

(58) Field of Classification Search
USPC ............................................... 709/204
See application file for complete search history.

(56) References Cited

U.S. PATENT DOCUMENTS

| | | | |
|---|---|---|---|
| 5,781,629 A * | 7/1998 | Haber et al. ............... | 713/177 |
| 6,732,145 B1 * | 5/2004 | Aravamudan et al. ........ | 709/204 |
| 7,003,550 B1 * | 2/2006 | Cleasby et al. ............. | 709/205 |
| 7,051,274 B1 * | 5/2006 | Cottrille et al. ............. | 715/210 |
| 7,454,760 B2 * | 11/2008 | Mohan et al. ............... | 719/318 |
| 7,502,835 B1 * | 3/2009 | Cheng ......................... | 709/217 |
| 2004/0088646 A1 * | 5/2004 | Yeager et al. ............... | 715/500 |
| 2004/0225716 A1 * | 11/2004 | Shamir et al. ............... | 709/204 |
| 2008/0028323 A1 * | 1/2008 | Rosen et al. ................. | 715/752 |
| 2008/0091954 A1 * | 4/2008 | Morris et al. ................ | 713/187 |
| 2009/0006258 A1 * | 1/2009 | Ross ............................ | 705/59 |
| 2009/0006860 A1 * | 1/2009 | Ross ............................ | 713/189 |
| 2009/0006936 A1 * | 1/2009 | Parker et al. ................. | 715/200 |
| 2009/0077474 A1 * | 3/2009 | Mohan et al. ............... | 715/753 |
| 2009/0112990 A1 * | 4/2009 | Campbell et al. ........... | 709/205 |

\* cited by examiner

*Primary Examiner* — Djenane Bayard
(74) *Attorney, Agent, or Firm* — Shook, Hardy & Bacon L.L.P.

(57) ABSTRACT

Various embodiments described herein provide one or more of systems, methods, software, and data structures that allow a document, or other file type, to be used to connect to a network-based conference, such as over the Internet. Some embodiments may further allow a local copy of a document, viewed by each conference participant on their local computing devices, to be used as a conferencing tool by synchronizing document views across each local document copy and edits or other modifications and notations made by each participant. As a result, an actual image of the document of a document-based conference need not be shared. Rather, only the edits or other modifications and notations made by each participant are captured, transmitted, and recreated and displayed within the local document copies of the other participants.

18 Claims, 8 Drawing Sheets

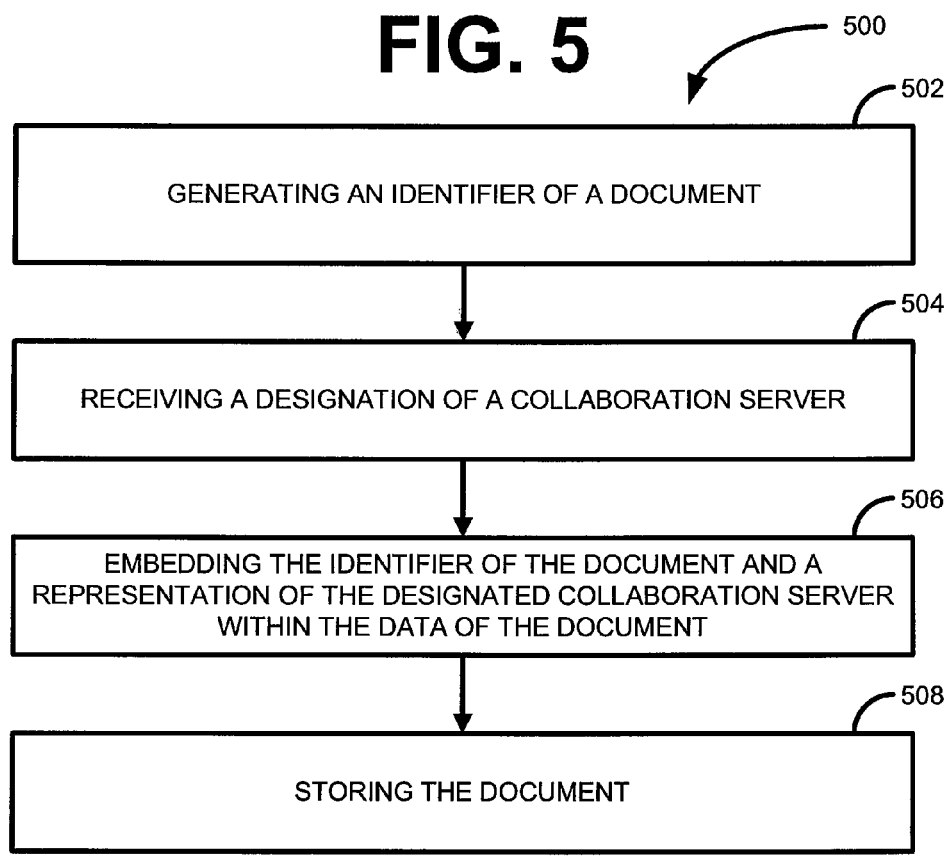

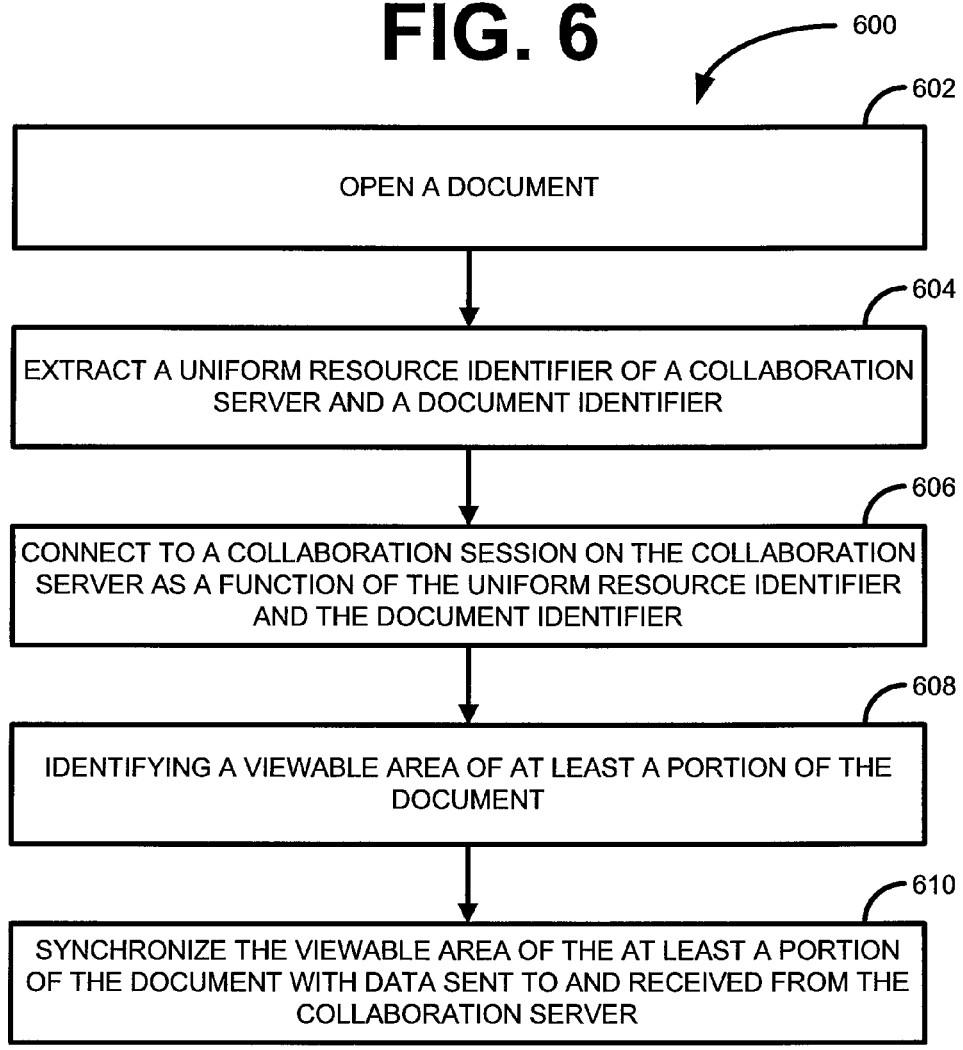

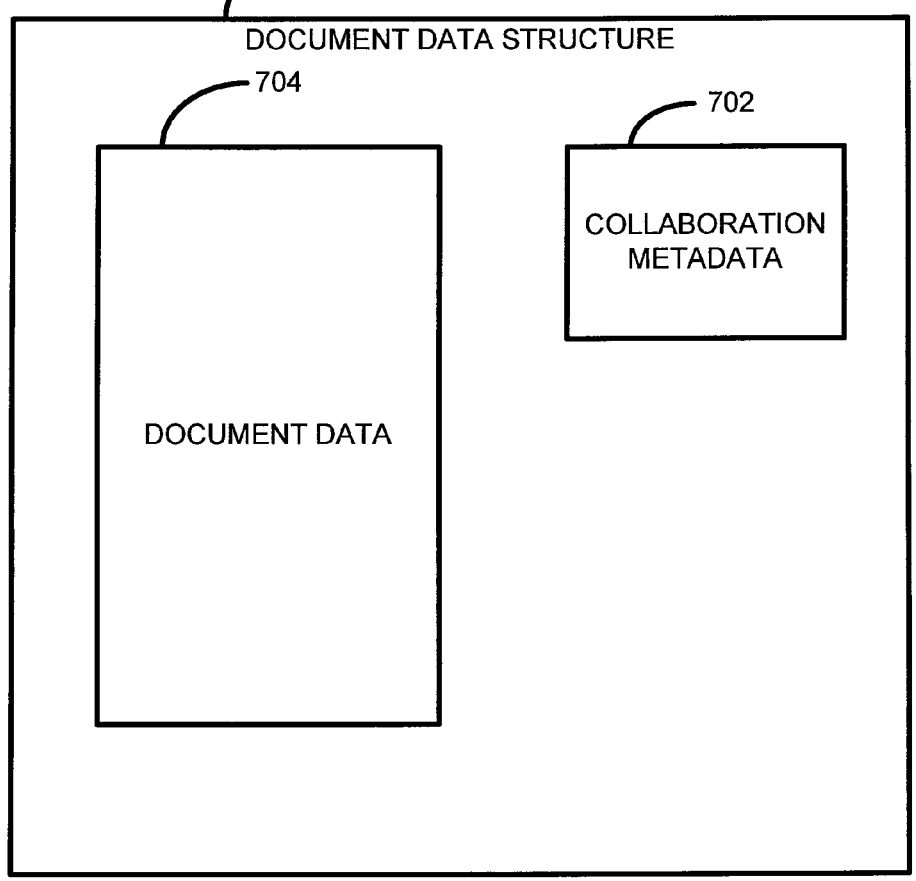

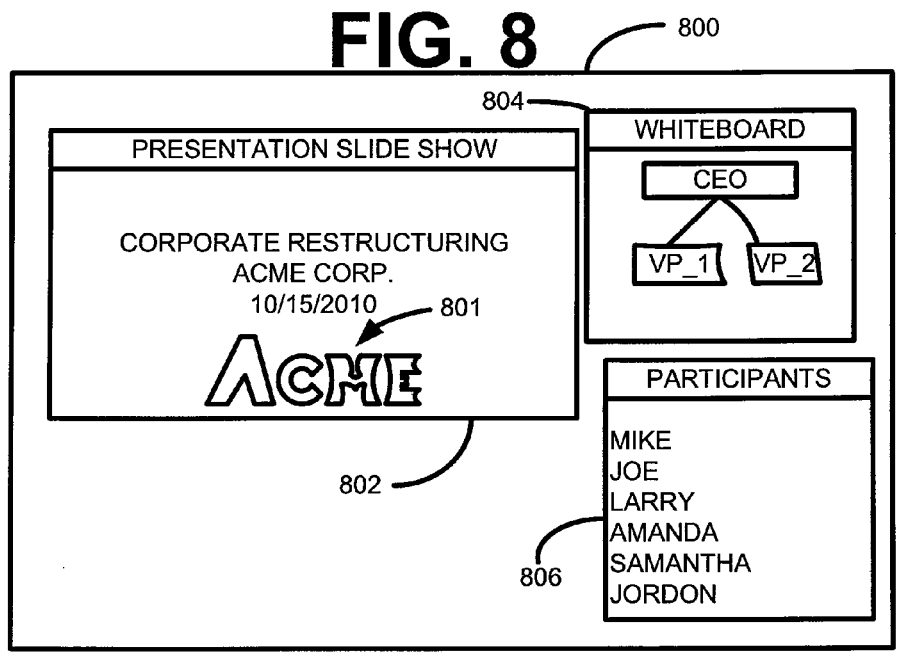
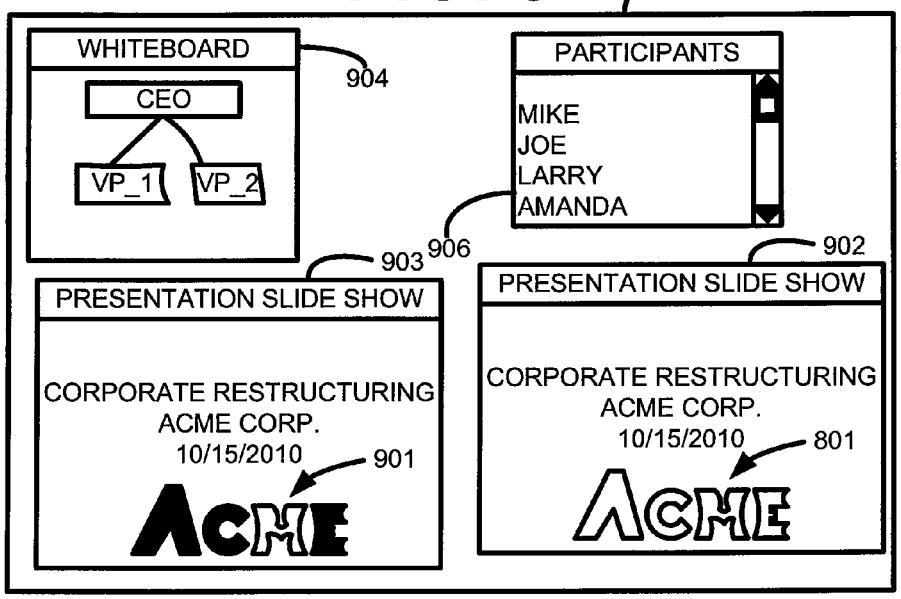

DOCUMENT BASED CONFERENCING

BACKGROUND INFORMATION

Use of network hosted conferencing, such as over the Internet, has grown considerably in recent years. There are products on the market that allow a presenter to share views through desktop images and audio over a central server with many conference participants. Some of these products may also be used in a collaborative environment, such as between members of a development team. In such instances, control of a computer or computer application on one computer may be shared over a network with other users. Such products offer such functionally in a very similar manner through a server that requires a standalone client software application on each computer of each participant. Such client software is tightly coupled to a server that receives data from one client and distributes the data to other participating clients. The client software is typically created and distributed by the same developer of the server software to prevent compatibility and security issues between the client and server software.

Use of such conferencing technologies typically requires conferencing specific software, often in the form of a conferencing-specific standalone application or a conferencing specific plug-in, to be present on each participant's computing device. Such participants then must provide login credentials to connect to the conference.

BRIEF DESCRIPTION OF THE DRAWINGS

FIG. 5 is a block flow diagram of a method according to an example embodiment.

FIG. 6 is a block flow diagram of a method according to an example embodiment.

FIG. 7 is a block diagram of a document data structure according to an example embodiment.

FIG. 8 illustrates a user interface according to an example embodiment.

FIG. 9 illustrates a user interface according to an example embodiment.

DETAILED DESCRIPTION

Figure 1:
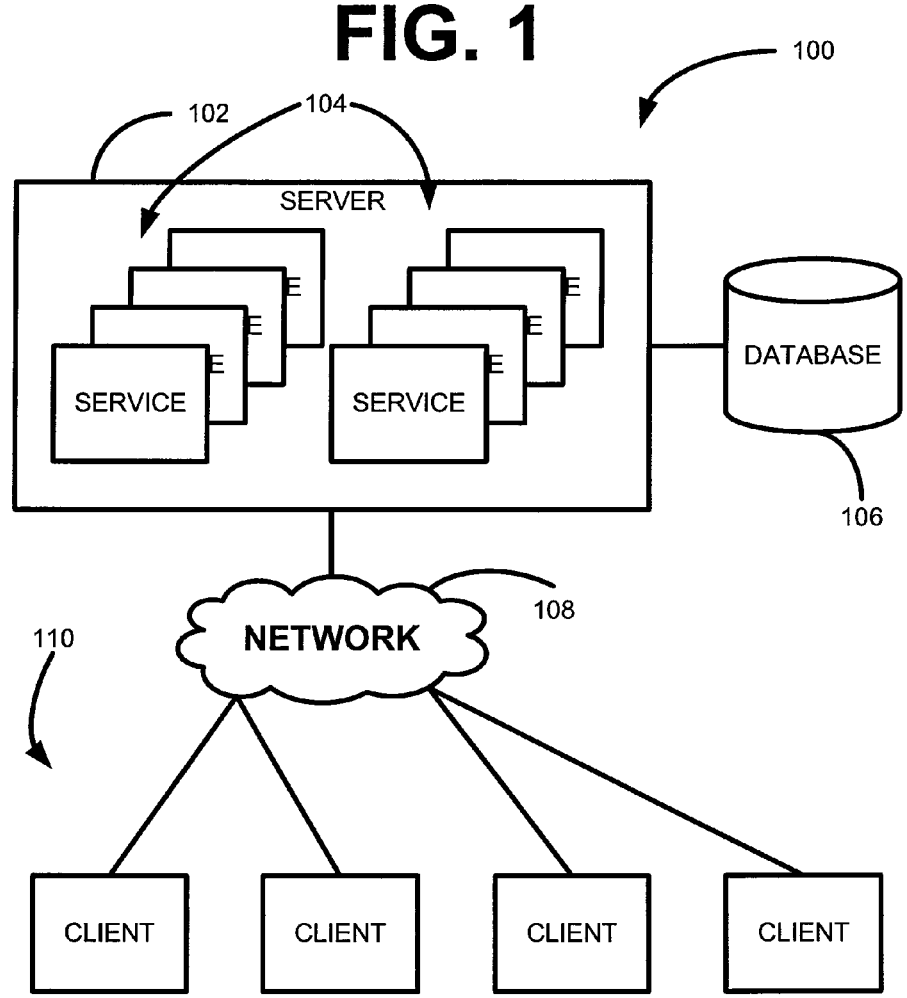
FIG. 1 is a block diagram of a system according to an example embodiment.

Although current conferencing applications provide many abilities, some of these abilities are limited. Various embodiments described herein provide one or more of systems, methods, software, and data structures that allow a document, or other file type, to be used to connect to a network-based conference, such as over the Internet. Some embodiments may further allow a local copy of a document, viewed by each conference participant on their local computing devices, to be used as a conferencing tool by synchronizing document views across each local document copy and edits or other modifications and notations made by each participant. As a result, an actual image of the document of a document-based conference need not be shared. Rather, only the edits or other modifications and notations made by each participant need to be captured, transmitted, and recreated and displayed within the local document copies of the other participants.

A document author, or other individual in possession of an electronic copy of the document, or other electronic file type, may enable network-based conferencing based on the document. In some such embodiments, the document author, or other individual in possession of an electronic copy of the document, may enable one or more collaboration sessions based on the document itself. Such collaboration designation typically includes selecting a collaboration server to host the collaboration, creating a unique identifier of the document, and storing a Uniform Resource Identifier ("URI"), such as a Uniform Resource Locator ("URL"), of the collaboration server and the unique document identifier in the document. The electronic document may then be distributed by virtually any means. Then, when the document is opened by an appropriate application, the application extracts the URI and the unique document identifier and connects to the collaboration server according to the URI for a conference based on the document identified by the unique document identifier. These and other embodiments are described in detail below.

Note the term "document" is used interchangeably with the term "file," unless expressly stated otherwise or as is readily apparent from the meaning of the language herein. Thus, "document," is intended to represent an electronic file that may be a document, such as an electronic document authored using a word processing application, or other electronic file type, which may be opened for viewing and/or editing.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 typically includes a server 102 that may communicate with clients 110 over a network 108. The server 102 may offer one or more collaboration services 104 to the clients 110 through web service calls that may be sent to and received from the collaboration services 104 over the network 108.

In some embodiments, the collaboration services 104, when called or otherwise utilized, may consume, manipulate, create, or store data. This data may be stored on the server 102, on another server, in a database 106, or in another data storage location. In some embodiments, this data may include data identifying document identifiers of documents setup for document-based conferencing, authorized users, user or organizational collaboration service subscription and usage information, configuration settings, and other data that may be consumed, manipulated, created, or stored during operation of one or more of the collaboration services 104.

The collaboration services 104 divide functionality of collaboration applications to allow other applications, such as document-based conferencing enabled applications, to leverage collaboration functionality. This provides the potential to develop any number of different kinds of client 110 applications that rely on the same collaboration services 104. Accordingly, a developer may conveniently add new features to a client 110, leveraging a provided set of collaboration services 104. For example, one embodiment may expose streaming audio/video, data messaging, and presence, user identity, roles, and the like as services that may be leveraged by client applications. In one such embodiment, document-based conferencing abilities may be included within a document editing application and such conferencing may be conducted to share a view of a document, and even document editing capability, with each conference participant along with a shared audio/video stream, text-based data messaging, and participant identity data. Such In addition, as mentioned above, previous collaboration applications required that everything performed by a server be tightly bound to one specific client. To the contrary, some embodiments may include a cloud of servers, dedicated to provisioning of collaboration services, which may host collaboration rooms or sessions of multiple client types, such as a document viewing or editing application used by each participant of a document-based conference. Further, a number of variations and types of clients may be specifically built and embedded within other applications, such as a graphics editing application, a page description language view application, a word processing application, and other typical stand alone application types. In one such embodiment, a first document-based conference participant may utilize an application that is not identical to an application utilized by a second conference participant. For example, the first participant may participate using a version of the ADOBE® ACROBAT® STANDARD application that is enabled for document-based conferencing and the second participant may participate using a version of the ADOBE® ACROBAT® READER application that is enabled for document-based conferencing.

Some embodiments may be realized with respect to two parts. Firstly, one or more servers 102 may be dedicated, in whole or in part, or may be refactored from working with a specific application to working with any kind of client 110 collaboration application. Secondly, client 110 applications may be "componentized." For example, clients 110 may be broken down so that any developer who wants to build a real-time collaboration application can reutilize the specific client 110 components and include these components into client 110 applications or merge them into unique client 110 applications. By mixing and matching client 110 components, which know how to speak directly to a set of services 104, a developer may build multiple variations of client applications 110 that enable real-time collaboration or other communication, such as communication to enable document-based conferencing. Client-side components, such as webcam, rosters, shared whiteboards, text-based chat, and the like, are provided to developers. Each of such components relies on their specific and dedicated web service for the respective component type. However, in some embodiments, custom developed components may use one or more of the set of services 104 to provide desired functionality.

Some such embodiments provide a developer kit of controls or tools that may be embedded within client 110 applications and configured to communicate with the services 104 on one or more servers 102. Some embodiments, such as web-based embodiments and some stand-alone application embodiments, may include code that invokes a client plug-in, which may be a non-conferencing specific plug-in, such as the ADOBE® FLASH® player available from ADOBE SYSTEMS INCORPORATED of San Jose, Calif., or other runtime client. In some embodiments, a plug-in may be utilized to enable document-based conferencing. Such a plug-in, in some embodiments, is enabled to capture input, user interface views, and data displayed within a user interface of an application the plug-in is attached to and shares that data with other participants utilizing one or more of the services 104 of the server 102.

Figure 2:
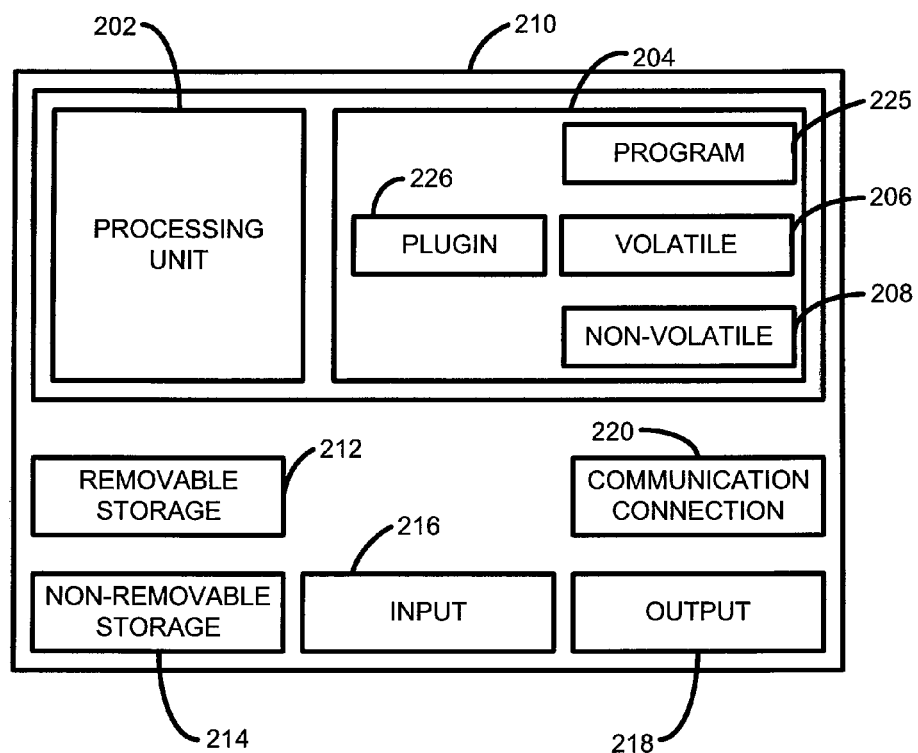
FIG. 2 is a block diagram of a client system according to an example embodiment.

FIG. 2 is a block diagram of a client system 210 according to an example embodiment. In one embodiment, multiple such client systems 210 are utilized in a distributed network in a collaborative application environment. A service-oriented architecture may be used to implement such services and communicate between the multiple client systems 210 and collaboration services on a server. One example client system 210 in the form of a computer may include a processing unit 202, memory 204, removable storage 212, and non-removable storage 214. Memory 204 may include volatile memory 206 and non-volatile memory 208. Client system 210 may include—or have access to a computing environment that includes—a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Client system 210 may include or have access to a computing environment that includes input 216, output 218, and a communication connection 220. The input 216 may include one or more of a pointing device such as a mouse, a keyboard, electronic pen type input, an audio input device such as a microphone coupled to an audio card or other dedicated audio circuit, a web cam, a screen capture program or device, or other input device. The output 218 may include a video monitor, speakers coupled to the audio card or other dedicated audio circuit, a printing device, or other output device.

The client system 210 typically operates in a networked environment using the communication connection 220 to connect to one or more remote computers, such as one or more servers offering collaborative services that enable collaboration between client system 210 and other remote computers. The remote computers may include one or more of a personal computer ("PC"), server, router, network PC, a peer device, or other common network node, and the like. The communication connection 220 may include a Local Area Network ("LAN"), a Wide Area Network ("WAN"), the Internet, a Virtual Private Network ("VPN"), a peer-to-peer network, or other networks.

Computer-readable instructions stored on a computer-readable medium are executable by the processing unit 202 of the client system 210. A hard drive, CD-ROM, and RAM are some examples of articles including a computer-readable medium. For example, a computer program 225 implementing collaboration services of a collaboration server by capturing one or more of data, gestures, video, audio, and the like within the computer application 225 or on the client system and transmitting the captured data to a collaboration server utilizing web service calls. The collaboration server may then replicate the data and send the data to one or more remote computers. The computer program 225 may also receive such data from the collaboration server, the data originating on one or more remote computers. Upon receipt of data from the collaboration server, the data is parsed to identify a portion of the application to which the data pertains and then the data is evaluated to determine what to do. This may include replicating a computer program action represented in the data, replicating data, opening an audio or video stream, playing audio or video data, replicating a gesture action with a gesture tool such as a mouse, or other action or data modification, deletion, creation, or insertion. In some embodiments, the computer application 225 leverages functionality of a plug-in 226 to perform one or more functions such as capturing, outputting, encoding, and/or decoding collaboration data. As mentioned above, the plug-in may be the Adobe® Flash® player. However, in other embodiments, the plug-in 226, or another client component, may be a custom developed piece of software developed to implement one or more services offered by a collaboration server.

In some embodiments, the computer program 225 is a document editing or viewing application. Examples of such applications may include word processing applications, spreadsheet applications, image and graphic authoring and editing applications, video editing applications, document viewing applications such as one or more of the various versions of the ADOBE® ACROBAT® application family, spreadsheet applications, and virtually any other user-interface-based computer application. In some such embodiments, the computer program 225 may include executable instructions to enable a document for document-based conferencing. Execution of such instructions may be triggered by selection of a menu item or other action within a user interface of the computer program 225. Such executable instructions may further include instructions to cause the computer program 225, when opening a document or upon receipt of a user command, to determine if a document is enabled for document-based conferencing, and if so, connect to a collaboration server identified within the document over the communication connection 220. The computer program 225 is also typically configured to capture input to the document, such as document modifications and notations, and send representations of that input to the collaboration server. The computer program 225 may also receive such input representations from the collaboration server that originated with other conference participants and cause those input representations to be reflected within the document within the user interface of the computer program 225. Example methods performed by the computer program 225 are provided below with regard to FIG. 5 and FIG. 6.

Figure 3:
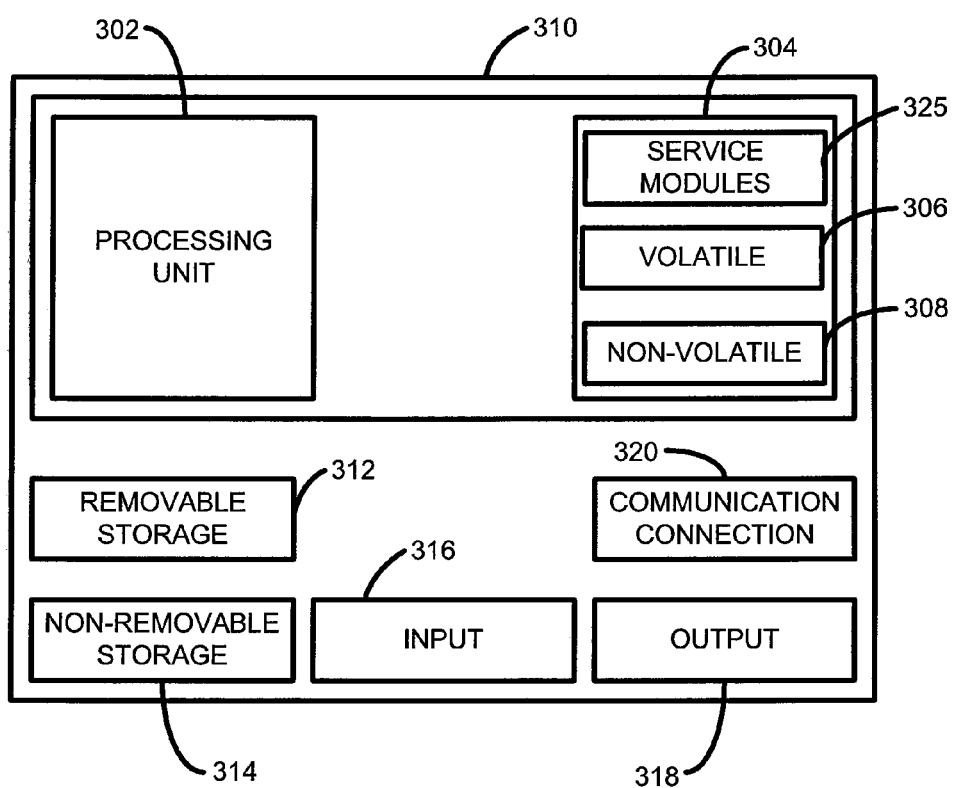
FIG. 3 is a block diagram of a server system according to an example embodiment.

FIG. 3 is a block diagram of a server system 310 according to an example embodiment. In one embodiment, multiple such server systems may be utilized in a distributed network to implement multiple services in a collaborative application environment. A service-oriented architecture may be used to implement such services and communicate between the multiple client systems utilizing collaboration services offered by the server system 310 and potential other server systems 310, depending on the embodiment. One example server system 310 is in the form of a computer, which may include a processing unit 302, memory 304, removable storage 312, and non-removable storage 314. Memory 304 may include volatile memory 306 and non-volatile memory 308. Computer 310 may include—or have access to a computing environment that includes—a variety of computer-readable media, such as volatile memory 306 and non-volatile memory 308, removable storage 312 and non-removable storage 314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Server system 310 may include or have access to a computing environment that includes input 316, output 318, and a communication connection 320. The computer may operate in a networked environment using the communication connection 320 to connect to one or more remote computers, such as one or more client systems 210 illustrated in and described with regard to FIG. 2. The communication connection 320 may include a Local Area Network ("LAN"), a Wide Area Network ("WAN"), the Internet, a Virtual Private Network ("VPN"), a peer-to-peer network, or other networks.

Figure 4:
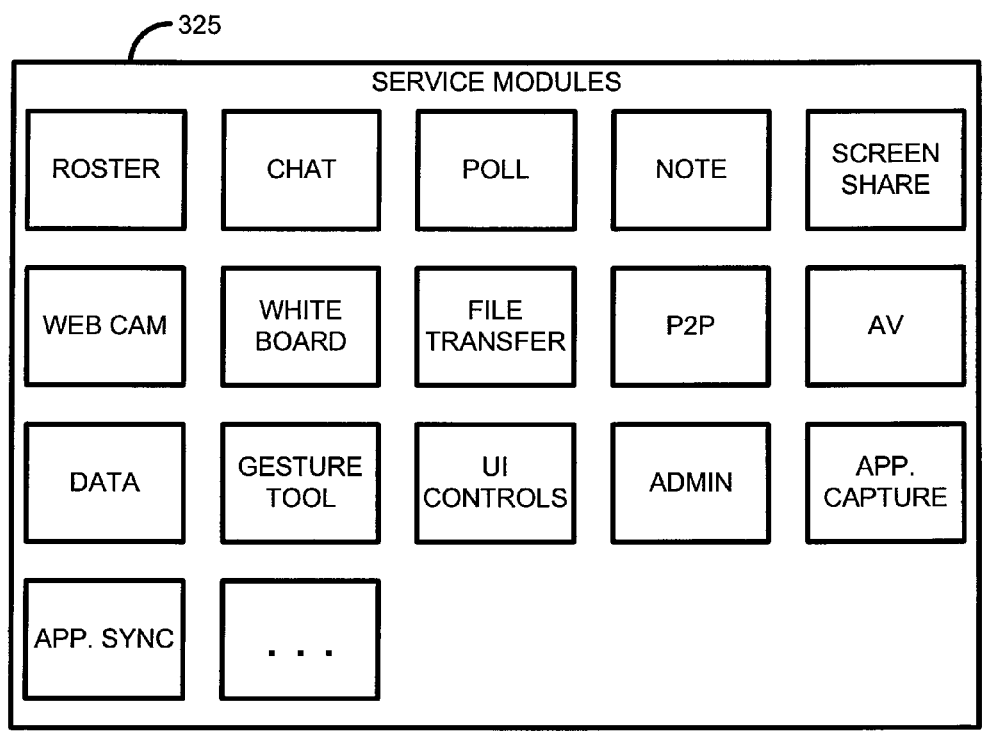
FIG. 4 is a block diagram of service modules included within a server system according to an example embodiment.

Computer-readable instructions stored on a computer-readable medium are executable by the processing unit 302 of the server system 310. A hard drive, CD-ROM, and RAM are some examples of articles including a computer-readable medium. The computer-readable medium, in an example embodiment, may include one or more service modules 325 that are operable to provide collaboration services, such as web services, to client collaboration applications. In typical embodiments, the collaboration service modules 325 are application and data agnostic, meaning that the collaboration service modules allow any application to call the collaboration services and the collaboration services may be a conduit for transmission of any data so long as an appropriate collaboration service is utilized. For example, a client application, such as a client application enabled for document-based conferencing, may be developed to utilize a general collaboration service. The general collaboration service may only require that data received from a first client collaboration application, to be broadcast to one or more other client collaboration applications, include a minimal amount of specific data for the service to be called, and all other payload data included in the service call is broadcast to the other client collaboration applications without inspection. Further, the collaboration services may only require that they be called in a particular manner, such as a proper formatting of the service calls, and do not require that they be called by a particular client program. As a result, any client application may utilize the services of the service modules 325 to collaborate with virtually any type of data the client applications may utilize. FIG. 4, and its description below, provides detail as to the services modules 325 that may be available in some embodiments.

FIG. 4 is a block diagram of service modules 325 included within a server system 310, as illustrated in FIG. 3, according to an example embodiment. The service modules 325, as described above, provide services accessible over a network that may be utilized by client collaboration applications, which may include document-based conferencing enabled applications. The service modules 325 receive data from a first client collaboration application through a web service call and unicast, broadcast or otherwise transmit the received data to other client collaboration applications participating in a collaboration session, such as by joining a collaboration "room." In the context of document-based conferencing, the collaboration "room" used to conduct such a conference includes a document upon which the conference is based. For example, a document view may be shared using one or more of the collaboration services. However, in some embodiments, neither a view of the document nor the document's contents are transmitted utilizing the service modules 325. Rather, a reference to a viewable portion of the document is transmitted utilizing one or more of the service modules 325 to allow client applications to synchronize a view of a copy of the document resident on the computing device of each participant. One or more of the service modules 325 may be further utilized to receive and transmit modifications to the document that is the subject of the conference.

A collaboration server, such as server system 310 of FIG. 3, provides several collaboration services. These collaboration services may implemented through service modules 325, which may be objects, programs, application programming interfaces, or other units of software. In some embodiments, each service is embodied in a single module. In other embodiments, multiple services are embodied in a single module. Combinations of services within modules may be made based on a class of functionality, such as by the type of data communicated through the module, the type of communication, such as inbound or outbound, or in virtually any other manner. Thus, although the service modules 325 are described below as providing certain services, these services may be provided in a single module, a few modules, or many modules. The name given to the particular 325 module in the following description is given merely to describe the type of functionality the particular service module is provided for and is not intended to limit modules within which services may be included.

The service modules 325 may include modules to implement functionality, such as: roster, chat, polling, notes, screen sharing, web cam or other streaming video, shared white board, file transfer, transfer of data to enable peer-to-peer ("P2P") communication between two or more client applications, audio and visual, general data transfer, gesture tool (such as a pointing device or cursor), user interface controls, administration, and others depending on the embodiment.

A roster service module, in some embodiments, offers services to identify collaboration session participants and present participant information in a roster type control within one or more client collaboration applications connected to a collaboration session. The roster module may also provide services to identify and implement roles of one or more collaboration session participants, such as organizer, presenter, administrator, participant, and the like. Such roles may be declared using administrative services of the administration module. Such roles may allow or limit certain functionality of collaboration session participants.

The administration module may also be used to create or schedule a collaboration session, authorize participants of a collaboration session, modify or create participant roles and permissions, declare a collaboration session as closed to a finite number of participants, certain participants, or publicly available.

The chat service module typically provides services that enable text-based chat between collaboration session participants. In some embodiments, the chat services may allow a participant to send a chat message to less than all of the other participants if desired. In some embodiments, based on a permissions of a certain role as declared in the administration service module, messages of a particular participant may be blocked from transmission to other participants, such as in the event the block participant is abusing the chat functionality. Chat messages may also be sent to an administrator for approval prior to communication to other collaboration session participants.

The polling service module typically allows one participant to set up a poll for other participants to answer. The polling service module may then collect the results of the poll and present them to the creator. The polling results may also be shared with one or more other participants.

The note service module typically provides services that allow transmission of a note to one or more other participants. This may include a text block placed as a control on a certain portion of a shared screen view. The Screen share service module provides services to share a screen view of one client application with other participants. The screen share services may also allow sharing control of the screen, such as allowing one or more other participants to provide input via a keyboard and pointing device.

The web cam service module typically provides services to share streaming video between collaboration session participants. In some embodiments, use of the web cam service module services may be configured through services of one or more of the administration and web cam service modules to limit the number of shared video streams or allow only a presenter's video stream to be displayed. A shared video stream may also include audio.

The white board service module provides services to receive and share whiteboard type input. Whiteboard input typically includes drawings made within a virtual whiteboard. As with the streaming video services described above, use of the whiteboard services may be limited to only a presenter and/or other roles.

The file transfer service module typically includes services that allow one collaboration session participant to upload a file and transfer the file to all, or a select number of, other participants. For example, a file may be uploaded and designated for transmission to one or more specific participants based on identity data from the roster service module, participants having a particular role or permission level, participants in a certain department or geographic location based on data which may be stored in a location accessible to a client collaboration application or accessible by a service module service, or based on other criteria.

The P2P service module includes services to facilitate exchange of network connectivity data between two or more users to establish a peer-to-peer communication connection between the users over a network. In some such embodiments, once the network connectivity data has been exchanged utilizing a service of the P2P service module, two or more client collaboration applications may exchange collaboration data directly with one another. In some such embodiments, a collaboration session may then be conducted, in whole or in part, in a P2P fashion.

The audio/visual service module includes services to exchange audio, video, and combined audio and video, such as in streams, between collaboration session participants. In some embodiments, the audio and video services may be unidirectional, meaning that audio and video of only one participant is shared at a time as set utilizing one or more services of the audio/visual or administration service modules. The audio services, in some embodiments, may include Voice over Internet Protocol ("VoIP") services. Audio and visual data may also be administered to be shared only by or with certain individual participants or participants having a particular role.

The gesture tool service module may include services to share gestures made by participants with a pointing device, such as a mouse, a cursor within an application, a highlighting tool, or other gesturing device. The user interface controls service module may include services that are specific to certain user interface controls. In some embodiments, user interface control services identify a particular control within client collaboration applications and an action with regard to that control, such as "has focus," "clicked," typed text, submit, or other action.

The data service module includes services to allow exchange of free-form data between collaboration applications. Such services are data and application agnostic, meaning that the data service module does not process the service calls to verify the data came from a specific type of application or that the data is of a particular type or in a particular format. These services merely require that the service be called or invoked in a proper manner. Such services allow application developers to create customized application elements and share data in a collaborative fashion between the elements. Such application elements may include elements that capture data within applications that is to be shared with collaboration session participants. Such data may include text from documents, numeric data from spreadsheets, data indicative of actions performed within an application, or other data within virtually any other application. In some embodiments, the data services may be embedded within an application in a manner that is not visible, or otherwise apparent to a user. In some document-based conferencing embodiments, the document editing applications of participants utilize the data service module to as the conduit to share data. This data, once captured, may be transmitted using the services of the data service module and communicated to other participants. The other participants receive this data and the application will handle the data as specified by a developer of the application. Thus, using the services of the data service module, custom applications may be developed with customized collaboration features to capture data and actions and receive and process or display those actions within application instances of collaboration session participants.

The application capture service module includes services to allow sharing of edits or other modifications and notations made by each participant of a document-based conference. In some embodiments, the application capture service module includes services that may be utilized based on the type of modification made. For example, if a textual edit is made to a document, a service may be called referencing an addressable location within the document, such as a page and line number, and a textual change to make. This may include a service call to replace text, delete text, or insert text. In other embodiments, such as when the document is an image file, the addressable location may be a pixel address or pixel address range of pixels to modify and data identifying how the pixels are to be modified. In further embodiments, such as when the document is an audio or video file, the data addressable location may be identified with regard to a time element, such as time range, 34 seconds to 53 seconds, and data instructing that the audio or video data in that range be deleted or replaced with data included with the service call. Other embodiments may include other addressing mechanisms that are relevant to the particular document upon which the document-based conference is based.

The application synchronization service module includes services that may be utilized to synchronize views of local document copies. For example, in document-based conferencing, each conference participant has a local copy of the document upon which the conference is based. An application synchronization module service may be present in some embodiments that may be called to synchronize the local document copy views of the document with the document view of a participant application calling the service. In some embodiments, such a view synchronization service of the application synchronization service module may be called using an address portion, such as a page number, and a zoom factor. The address portion may vary based on the document type and the precision to which a synchronized view may need to be made. For example, if the document is an image file, the address portion may be a range of pixels, such as in the X dimension at pixels 345-679 and in the Y dimension at pixels 455-567.

In some further embodiments, the service modules 325 comprise only a single, generic service module that may take the form similar to that of the data service module described above. In such embodiments, client applications that call such a module include data in a payload when calling the service that will be understood by recipient applications of other participants. Such payload data may include data identifying how or what process is to process the remainder of the data payload.

Note that, in some embodiments, the applications of collaboration session participants are not required to be identical applications. What may be required is that the respective applications of the participants be enabled to communicate utilizing the services of the service modules 325 of the server system 310 illustrated and described with regard to FIG. 3 and FIG. 4.

FIG. 5 is a block flow diagram of a method 500 according to an example embodiment. The method 500 is one embodiment of how a computer program, such as a word processing application, page description language viewing or editing application, graphics or other audio/visual application, or other application may designate document for document-based conferencing.

In some embodiments, when viewing, or otherwise working with a document, on a computing device, the method 500 is a computerized method and includes generating 502 an identifier of a document and receiving 504 a designation of a collaboration server.

Generating 502 an identifier of the document may include generating a hash value as a function of the document and attaching the hash value to a Globally Unique Identifier ("GUID") of the computing device. In other embodiments, the generating the document identifier may include calling a service of a collaboration server to obtain a document identifier. Other embodiments may include other modes of generating 502 a document identifier, however the goal of the selected mode is to generate 502 a document identifier that is attributable to the specific document on a particular collaboration server.

Receiving 504 a designation of a collaboration server, in some embodiments, includes receiving user input of a URI, such as a URL, of a particular collaboration server. The user input of the URI may be received though text input, through a selection of a collaboration server from a list of collaboration servers provided to the user by the user's application performing the method 500, by a default configuration setting of the user's application performing the method 500, or other suitable input mechanisms.

The method 500 further includes embedding 506 (or otherwise associating) the identifier of the document and a representation of the designated collaboration server within data of the document and storing 508 the document. The embedding 506 of the document identifier and the representation of the designated collaboration server, in some embodiments, includes encoding the document identifier and collaboration server representation in a metadata form and placing the metadata within the data of the document. Depending on the document type and the particular embodiment, the metadata is typically placed within the document data in a location that will not affect the appearance of the document when viewed graphically within an application user interface. Such a location is often a file header or file trailer of the document file. However, depending on the file type, the location where the metadata is placed may be elsewhere.

After the method 500 has been performed and the document is stored 508, the document file may be distributed to others. The document file may be distributed by virtually any means including email, on a portable compute-medium such as a disk, USB memory device, external hard disk, or other medium, via download from a network location such as a web site or network drive, or other distribution methods. Those in possession of such a document may then participate in a document-based conference by opening the document in appropriate document-based conferencing application that will connect the holder of the document copy to the document-based conference. Note that in some embodiments, mere possession of the document file allows participation in such a document-based conference using an appropriate document-based conferencing application. However, in some other embodiments, user credentials may also be required, such as one or more identity information, a user ID, and a password that may be provided via a user interface of the document-based conferencing application.

FIG. 6 is a block flow diagram of a method 600 according to an example embodiment. The method 600 is one embodiment of how a computer program, such as a word processing application, page description language viewing or editing application, graphics or other audio/visual application, or other application may process a document file enabled for document-based conferencing.

The method 600 is a computerized method and includes opening 602 a document and determining if the document includes document-based conferencing connectivity data. Document-based conferencing connectivity data typically includes a document identifier and an address of a collaboration server, or an address identifying a specific collaboration session for the document on the collaboration server. In some embodiments, the document identifier and collaboration server address are a combined into a single data item. The determining if the document includes document-based conferencing connectivity data typically includes reading or parsing at least a portion of the document file, such as a file header, file trailer, or other identifiable file location, to determine if the connectivity data, such as in a metadata form, is present. If the document-based conferencing connectivity data is present, the method 600 includes extracting 604 a URI of a collaboration server and a document identifier, or other connectivity data depending on the embodiment.

The method 600 further includes connecting 606 to a collaboration session on the collaboration server as a function of the Uniform Resource Identifier and the document identifier and identifying 608 a viewable area of at least a portion of the document. The viewable area of the document is an area identified 608 as a function of the local document copy. The method 600 further includes synchronizing 610 the viewable area of the at least a portion of the document with data sent to and received from the collaboration server. The data sent to the collaboration server includes data representative of modifications made to the local document copy. The data received from the collaboration server includes data representative of changes made by other collaboration session participants to their respective local document copies. The data received from the collaboration server is used to replicate, within the local document copy, the changes made to the document by the other participants. In some embodiments, the changes may be replicated directly within the content of the local document copy. In other embodiments, the changes may be made, or optionally made, as markups to the local document copy that may be accepted or rejected.

In some embodiments, synchronizing 610 the viewable area of the at least the portion of the document with data sent to and received from the collaboration server includes tracking actions with regard to the document to identify document modifications and sending data representative of one or more modifications to the document. The data sent to and received from the collaboration server includes data representative of document modifications, the data including an identifier of at least one document location and instructions to change the at least one identified document location.

FIG. 7 is a block diagram of a document data structure 700 according to an example embodiment. The data structure 700 is one embodiment of a data structure that may be created according to the method 500 and opened, processed, and utilized according to the method 600. The data structure 700 includes a metadata portion 702 to hold conference connectivity data for a computer application capable of connecting to a collaboration server to conduct a network conference. The conference connectivity data, as discussed above, may include a document identifier and a URI of a collaboration server. In some embodiments, the conference connectivity data may also include an encryption key, such as a symmetric encryption key by which data sent to and received from a collaboration server may be encrypted and decrypted. The data structure 700 further includes one or more other portions 704 to hold data to be displayed via a graphical user interface, such as a graphical user interface of a document authoring or viewing application.

FIG. 8 and FIG. 9 illustrate user interfaces according to example embodiments. FIG. 8 includes a user interface 800 of a first participant of a document-based conference and FIG. 9 includes a user interface 900 of a second participant of the document-based conference. The user interfaces 800, 900 are user interfaces of applications enabled for document-based conferencing. Such applications may include, as discussed above, document editing and presentation applications, spreadsheet applications, image and video editing and presentation applications, audio and data editing and presentation applications, and other applications that may allow viewing and/or editing of other types of data. In some embodiments, such applications, which may include word processing, spreadsheet, or other applications may be Internet-hosted applications that may or may not include a software element resident on each participants computing device. Such applications may be accessible over a network, such as the Internet, and provide document authoring, editing, and document-based collaboration abilities. Such network hosted applications may be used to collaboratively generate a new document and then a collaboration server URI and document identifier, and/or other collaboration connectivity data, may be inserted into the document as discussed herein to designate the collaboratively created document for document-based conferencing.

FIG. 8 and FIG. 9 are discussed in parallel to provide examples of how one user interface may be modified and how those modifications are reflected in the other user interface. Thus, to know which of FIG. 8 and FIG. 9 is referred to, the 800 reference numbers refer to FIG. 8 and the 900 reference numbers refer to FIG. 9.

The user interface 800 includes a local document copy view 802 that is synchronized with a local document copy view 902 of the user interface 900. In operation, if the local document copy view 802, 902 of either user interface 800, 900 is modified, the applications providing the user interfaces 800, 900 send and receive data to synchronize their respective views 802, 902. The data sent to synchronize the views 802, 902 may be communicated via a collaboration server as discussed above. In other embodiments, the applications behind the user interfaces 800, 900 may communicate in a P2P manner.

The views 802, 902 of the local document copies, as illustrated, are views of a presentation slide show. When one view, such as view 802 is advanced one slide, a representation of a command to advance the view 902 one slide may be sent to the application behind the user interface 900, such as via a collaboration server, to cause the view 902 to advance one slide. In some embodiments, a change may be made to one or views 802, 902.

In some embodiments, one or more of the user interfaces, such as user interface 900, may also include a second view 903 of a document of a document-based conference. The second view 903 may be a clean copy of a document file upon which a document-based conference is being conducted. In some embodiments, such a view 903 may be modified or viewed differently without affecting a view of another participant. For example, both local document views 802, 902 include an "ACME" logo 801 include all outline, block style letters. A user may modify the "ACME' logo 901 of the view 903 to include three solid, non-outlined letters without the change being viewable with in the other shared views 802, 902. In other embodiments, the shared views 802, 902 may be modified and the second, non-shared view 903 is not affected.

The user interfaces 800, 900 may also include other elements such as roster elements 906, whiteboard elements 804, and other elements that may utilize one or more of the service modules 325 discussed above with regard to FIG. 3 and FIG. 4.

In some embodiments, as briefly discussed above, the user interfaces 800, 900 may be generated by a computer application operable on a computing device of each participant. Such an application typically includes a conferencing module operable to extract conference connectivity data from a dataset, such as a local copy of a document file. A portion of that dataset typically includes the connectivity data and another portion of the dataset includes data that is displayable within a user interface 800, 900. Such an application is also operable to connect to a collaboration server identified in the extracted conference connectivity data and join a conference as a function of data included in the conference connectivity data. Once connected, the application is operable to receive data from the collaboration server and present at least a portion of the received data within the data viewing user interface. In some embodiments, rather than connecting to a collaboration server, the connection is made to at least one other client computing device operating a compatible application and the document-based conference is conducted in a P2P manner between two or more participants.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computerized method comprising:
    generating an identifier of a document, the identifier of the document being a hash value generated as a function of the document;
    receiving a designation of a collaboration server, the collaboration server to synchronize an action across multiple instances of the document during a collaboration session, each document instance stored locally by a collaboration session participant;
    adding the identifier of the document and an identifier of the designated collaboration server within data of the document;
    storing the document, including the identifier of the document and the identifier of the designated collaboration server added within the data of the document, to a local data storage device of a computer performing the computerized method, the identifier of the document and the identifier of the designated collaboration server providing information to a collaboration session participant to connect to a collaboration session based on the document.

2. The computerized method of claim 1, wherein the action comprises at least one of a view action or a modification action.

3. The computerized method of claim 1, wherein the document is a document created within a web-based, collaboration enabled document authoring application.

4. The computerized method of claim 1, wherein the identifier of the designated collaboration server is a Uniform Resource Identifier.

5. The computerized method of claim 1, wherein the generating of the identifier of the document includes generating the identifier of the document as a function of a web service call to the designated collaboration server.

6. The computerized method of claim 1, wherein the adding of the identifier of the document and an identifier of the designated collaboration server within the data of the document includes:
    writing metadata to the document including the identifier of the document and the identifier of the designated collaboration server.

7. The computerized method of claim 1, wherein the storing of the document includes:
encoding the document according to a page description language file format specification.

8. A computerized method comprising:
accessing a first instance of a document, the first instance of the document stored locally to a computer and presenting a view of the first instance of the document on a display of the computer;
retrieving, from the first instance of the document, a Uniform Resource Identifier of a collaboration server and a document identifier associated with the first instance of the document;
connecting to a collaboration session on the collaboration server as a function of the Uniform Resource Identifier and the document identifier;
identifying a viewable area of the first instance of the document presented on the display of the computer; and
synchronizing the viewable area of the first instance of the document with a viewable area of a second instance of the document local to a computer of another collaboration session participant using data sent to and received from the collaboration server.

9. The computerized method of claim 8, wherein the synchronizing of the viewable area of the first instance of the document using the data sent to and received from the collaboration server includes:
tracking actions with regard to the first instance of the document to identify document modifications; and
sending data representative of one or more modifications to the first instance of the document.

10. The method of claim 8, wherein the synchronizing of the viewable area of the first instance of the document using the data sent to and received from the collaboration server further includes:
receiving data representative of a modification to the first instance of the document; and
modifying the viewable area as a function of the received data representative of the modification to the first instance of the document.

11. The method of claim 8, wherein the data sent to and received from the collaboration server includes data representative of document modifications, the data including an identifier of at least one document location and instructions to change the at least one identified document location.

12. A system comprising:
a processing unit;
a memory device;
a display device;
an instruction set stored on the memory device, the instruction set including instructions defining system elements comprising:
a data viewing user interface to be presented on the display device; and
a conferencing module executable by the processing unit to:
extract conference connectivity data from a document stored in the memory device, a portion of the document being displayable in the data viewing interface;
connect to a collaboration server identified in the extracted conference connectivity data;
join a conference as a function of data included in the conference connectivity data;
exchange peer-to-peer connectivity data with an other conference participant via the connection to the collaboration server;
establish a peer-to-peer connection with the other conference participant according to the peer-to-peer connectivity data;
conducting the conference in whole via the established peer-to-peer connection;
receive data via the peer-to-peer connection from the other collaboration participant and present at least a portion of the received data within the data viewing user interface.

13. The system of claim 12, wherein the conferencing module is further operable to:
capture data from the computer application; and
send a representation of the captured data to other conference participants via peer-to-peer connections, the captured data to be replicated to the other conference participants.

14. The system of claim 13, wherein captured data from the computer application includes one or more of additions, deletions, and modifications to data of the document.

15. The system of claim 12, wherein the conferencing module when presenting at least a portion of the received data within the data viewing user interface includes:
modifying the document; and
reflecting the modifications to the document within the data viewing user interface.

16. The system of claim 12, further comprising:
one or more components operable to exchange data with other conference participants via the collaboration server.

17. The system of claim 16, wherein one of the one or more components includes a text-based chat component which is operable to allow a conference participant using the computer application to exchange textual messages with other conference participants.

18. The system of claim 12, wherein the data viewing user interface is operable to display files encoded according to a page description language file format specification.

* * * * *